(Model.)
J. F. SNYDER & G. J. BLINZLER.
WHEEL.
No. 257,523. Patented May 9, 1882.
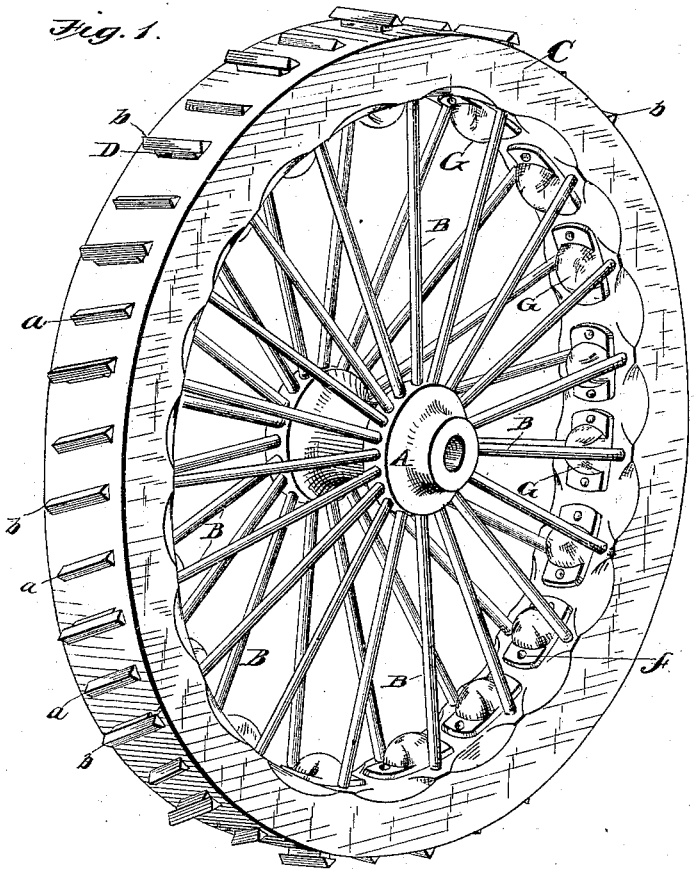
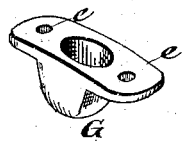
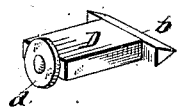
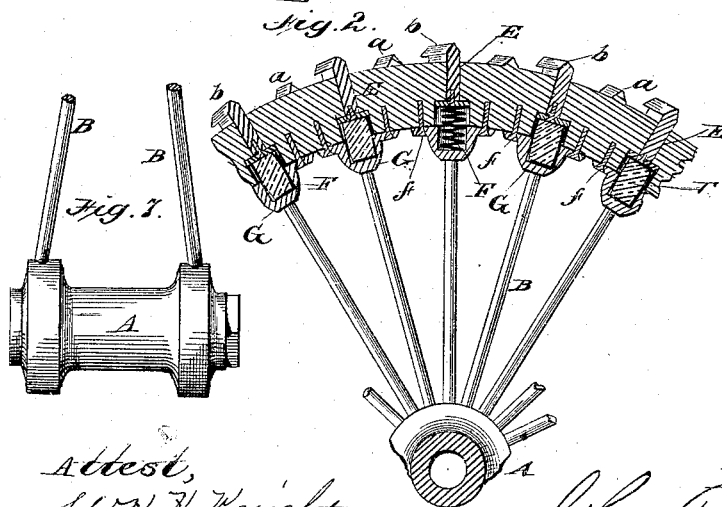

UNITED STATES PATENT OFFICE.

JOHN F. SNYDER AND GEORGE J. BLINZLER, OF BLAKESLEE, OHIO.

WHEEL.

SPECIFICATION forming part of Letters Patent No. 257,523, dated May 9, 1882.

Application filed February 9, 1882. (Model.)

*To all whom it may concern:*

Be it known that we, JOHN F. SNYDER and GEORGE J. BLINZLER, citizens of the United States of America, residing at Blakeslee, in the county of Williams and State of Ohio, have invented certain new and useful Improvements in Wheels; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a perspective view of a wheel with our invention applied thereto; Fig. 2, a sectional view, showing spokes and the relative position of the spurs, springs, and boxings when applied to a wheel; Fig. 3, a perspective of one of the boxings; Fig. 4, a perspective of one of the spurs; Fig. 5, a perspective of a rubber spring; Fig. 6, a side view of a spiral spring, and Fig. 7 a side view of a wheel-hub.

Our invention relates to vehicle wheels generally, and while it may be applied to sulky-plow and other wheels, yet it is particularly well adapted to traction-engine wheels; and it consists in providing the rim of the wheel with a series of spring-actuated spurs, (as hereinafter particularly described, and afterward sought to be specifically defined by the claims,) whereby said yielding spurs will project beyond the face or tire of the rim, so as to take a firm hold on the surface over which the wheel runs, and thereby prevent the wheel from slipping. The spurs, being forced outward by the springs, will also free the rim from the mud or earth which otherwise would cling thereto in wet weather.

In the accompanying drawings, the letter A indicates the wheel-hub, which is of the form adapted to receive a double set of spokes; but it may be of any other form, as our invention can be applied to any kind of wheel. The two sets of spokes B extend from the hub to the rim C, and are secured to those parts in the ordinary and well-known way. The face of the rim is provided, as usual, with the fixed spurs *a*. The parts so far referred to are of the ordinary construction and not our invention, and therefore have not been more particularly described.

The spur D which we use is made of any suitable metal or other material, and is formed with a wedge-shaped and shouldered face, *b*, so that it will take a good hold onto the ground and be prevented from being forced back clear through the socket in the rim in which it plays back and forth.

To the rear end of the shank *c* of the spur there is secured, by a screw or bolt or other means, a plate, *d*, of metal or other material of strength sufficient to support and bear the pressure of a spring bearing against it, so as to project the face of the spur out beyond the face of the wheel-rim. This plate also forms a shoulder to bear against a shoulder in the socket in the rim, so as to prevent the spur from dropping out of the socket from the face side of the rim.

If desired, the plate *d* may be formed in one piece with the shank instead of being made separate and connected thereto, as described, and the spur instead of being of the form shown may be of any other shape that will serve the same purpose; but if the plate is made in one piece with the shank the face of the spur should be of a form that will permit the spur to be withdrawn from the rear of the socket. The method illustrated is considered the best, because the bolt can be readily unscrewed and the spur withdrawn from the face of the rim, and the shoulder on the face of the spur will prevent the spur from being forced all the way into the socket.

The socket E, for the reception of the spur, is formed through the rim from its rear to its face, the rear portion thereof being wider or larger in diameter than the forward portion, so as to form a shoulder for the plate on the shank of the spur to fit and bear against, and a cup for the reception and retention of a part of the cushion or spring which bears against the back of the spur, all of which is clearly illustrated in Fig. 2 of the drawings.

The socket may be formed diametrically through the rim, or at any angle that will permit the satisfactory working of the spur, and it may be so formed that the face of the spur will be either at a right angle or oblique angle to the circumference of the wheel.

The spring or elastic cushion F, which may be either of vulcanized rubber or metal, and spiral in form, fits partially in the cup of the socket and partially in the hollow of the cap G, and is held against the back end or plate of the spur by the cap G. The cap or boxing G has flanges e, and is held to the rim of the wheel by screws or bolts f, passed through the flanges and into the rim. By thus securing the cap or boxing it can be readily detached, so that the spring and spur can be easily removed whenever it is necessary for any purpose to remove them. The inside walls of the boxing also serve to brace the spring. The length of the spur and depth of the cup portion of the socket depend on the extent it is found desirable to have the spur project beyond the face of the wheel. Any desirable number of the spurs can be used.

In using a wheel constructed as described, the spurs when the roads are hard will not be forced into the ground; nor is it necessary that they should be, for the wheel will not slip when the roads are in such a condition, but they will cushion, as it were, the wheel and lessen the strain on the spokes and jarring of the parts. When, however, the roads are soft by reason of wet weather, the cushioned spurs will be forced to a greater depth into the ground than the fixed spurs will or could be, whereby a better hold will be taken onto the ground and the wheels prevented from slipping. Of course as the spurs strike the ground they will to some extent be forced into their sockets, but as soon as they have passed from contact with the ground the cushions or springs will force them out again, and when forced out they will free the space between the spurs from the mud, which otherwise would pack on the tire or rim.

The cap or boxing protects the spring and the shank of the spur in the socket from mud or other matter which might clog the parts and interfere with their working.

Having fully described our invention and set forth its advantages, what we claim is—

1. The combination, with the rim of a wheel having a socket formed therein, of a spur projecting from and working in the socket, a boxing or cap having closed sides and top formed in one piece and fitting over the socket, and a spring or cushion fitting between the spur and boxing and bearing against both, the several parts being adapted to operate as described, and one cap to be removed without affecting the others, as set forth.

2. The combination, with the rim of a wheel having a shouldered socket, E, formed therein, of a spur, D, having a detachable plate, d, secured to its shank and adapted to fit within the socket in the wheel, a hollow boxing, G, having closed sides and top formed in one piece and fitting over the socket E, and a spring-cushion, F, fitting between the boxing and spur, substantially as and for the purpose set forth.

In testimony whereof we affix our signatures in presence of two witnesses.

JOHN F. SNYDER.
GEORGE J. BLINZLER.

Witnesses:
E. FOSTER,
FREDRICK BLINZLER.